UNITED STATES PATENT OFFICE.

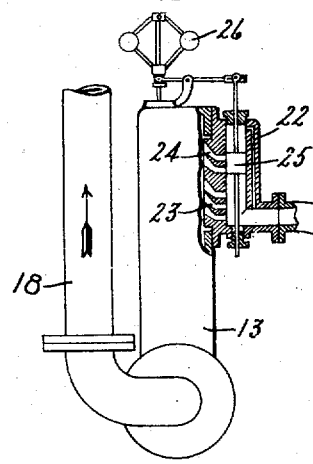
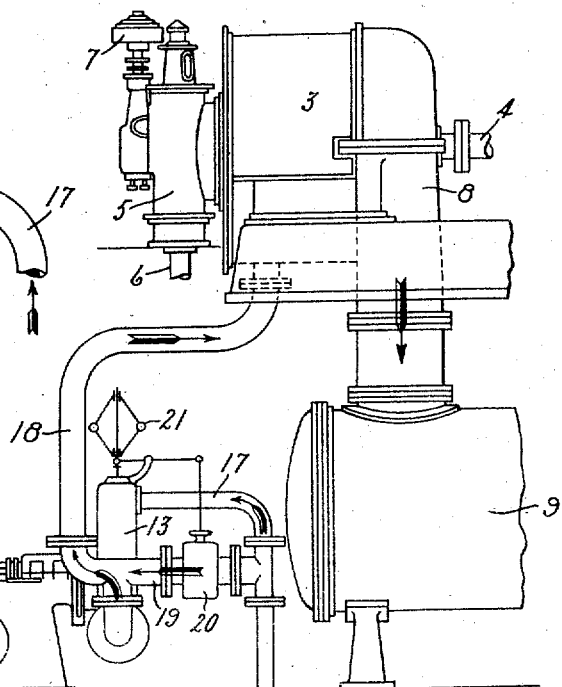
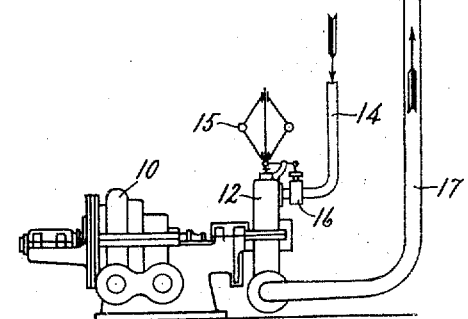

WALTER KIESER, OF BERLIN, GERMANY, ASSIGNOR TO GENERAL ELECTRIC COMPANY, A CORPORATION OF NEW YORK.

TURBINE SYSTEM.

1,081,387.  Specification of Letters Patent.  Patented Dec. 16, 1913.

Application filed January 13, 1909. Serial No. 472,062.

*To all whom it may concern:*

Be it known that I, WALTER KIESER, a citizen of Switzerland, residing at Berlin, Germany, have invented certain new and useful Improvements in Turbine Systems, of which the following is a specification.

In modern power plants for generating electricity or for propelling ships it is customary to employ turbines as prime movers. In plants of this character it is desirable, on account of their simplicity, small bulk and rugged construction, to utilize turbines for driving the auxiliary apparatus used with the main turbines, such apparatus, for example, as the centrifugal or other pumps for circulating water through the condensers and the pumps for removing air from said condensers.

The present invention has for its object the provision of a system or arrangement of main and auxiliary turbines wherein the turbines driving the auxiliary apparatus can be operated at any desired relatively low speed by utilizing the pressure difference between their steam supply and any suitable stage of the main turbines into which the exhaust steam from the auxiliary turbines may be delivered to do further work in said main turbines, and wherein when variations occur in the load on the main turbines it is possible to utilize the corresponding variations in the pressure differences on the auxiliary turbines and proportion the quantity of motive fluid necessary for the operation of the auxiliary turbines to the load on the main turbines while keeping the speed of the auxiliary turbines at a proper value, thereby maintaining a high degree of efficiency of the system as a whole.

In carrying out my invention the main turbine or turbines have connections to the boilers and to the condensers or other exhaust in the usual manner and the rotating element of the turbine is connected to any suitable load. In a turbine thus arranged, the steam pressure, which may, for example, have an initial value of 175 pounds or more, decreases from this initial value to exhaust pressure as the steam expands either gradually or by a series of steps, depending upon the type of turbine. Hence it is possible to take steam at boiler pressure, pass it through auxiliary turbines wherein a predetermined and relatively small pressure drop or difference is maintained and discharge it into the main turbine at some convenient point or stage having a pressure corresponding to the pressure of said discharge, from which point to the main exhaust it will perform useful work in the usual manner. Under such conditions the auxiliary turbines will operate with maximum economy at a relatively low speed best adapted for the pumps driven by them, whereas, if they exhausted into the atmosphere or into a condenser, considerations of steam economy would require that they run at a relatively high speed. Such a speed would necessitate the use of suitable speed reduction means between the turbines and the pumps which would complicate the apparatus and be objectionable for other reasons. The auxiliary turbines are arranged in series relation. The first turbine of the series receives steam as above described from the boilers or other suitable source and exhausts it in whole or in part through the other auxiliary turbine or turbines into a lower stage of the main turbine. Each auxiliary turbine has a suitable governing or regulating mechanism for controlling the quantity or the pressure and quantity of the supply of motive fluid thereto, as its speed and load tend to vary with the variations of the load on the main turbine, which mechanism proportions the quantity of steam used by the auxiliaries to the load on the main turbine and increases the economy of the system.

In the accompanying drawing, Figure 1 illustrates one of the embodiments of my invention in which two auxiliary turbines arranged in series relation are used with a main turbine and its condensing apparatus; and Fig. 2 is a modification of the governing or regulating mechanism of one of the auxiliary turbines.

The main turbine 3 can be of any desired type of construction and its shaft 4 can be connected to an electric generator or to a propeller or other load. Steam or other elastic fluid from any suitable source is admitted to the valve chest 5 by a conduit 6. The supply of motive fluid to the turbine is controlled by a governing mechanism 7 of any approved form. In the present case this mechanism is responsive to speed variations of the shaft 4. A conduit 8 leads the exhaust from the turbine to a surface or other condenser 9 or to the atmosphere.

The pumps 10 and 11 form a part of the condenser system. They are driven by the turbines 12 and 13, respectively. Live steam is supplied to the turbine 12 by a conduit 14 which is or can be connected to the same source that supplies the turbine 3. For convenience the conduits 6 and 14 are shown as separate conduits but obviously they could be connected in any desired manner. The passage of steam from the conduit 14 to the turbine 12 is controlled by a governor 15 driven from the shaft of the turbine, which governor acts on a suitable valve or device 16 that may vary the area of the stream of steam flowing into the turbine without affecting its pressure or it may reduce the quantity and pressure of the steam supply by throttling it. The steam after acting on the wheel buckets of the turbine 12, which is preferably but not necessarily of the Curtis type, is exhausted from the turbine into a conduit 17 that leads to the turbine 13 which is of a similar type. The exhaust from the turbine 13 passes through a conduit 18 to a suitable stage or region of the main turbine.

Leading from the conduit 17 at a point before it enters the turbine 13 to a point in the conduit 18 between the turbines 13 and 3 is a conduit 19 containing a valve or other device 20 which regulates the flow through said conduit. A governor or speed responsive device 21 driven from the shaft of the turbine 13 controls the operation of the valve 20, opening it as the speed rises above normal and closing it as the speed returns to its proper value. When the pressure in the main turbine falls off due to a decrease in load or any other cause, the pressure in conduit 18 is decreased in a corresponding manner. As a result of this decrease of pressure at its outlet, the inlet pressure remaining the same or substantially the same as before, the auxiliary turbine 13 is subjected to the effect of a greater pressure drop or difference between its inlet and outlet and its speed increases. The increased speed causes the regulator 21 to open the valve 20 to a greater or less extent and permit a portion of the exhaust from the turbine 12 to pass around the turbine 13 directly to the conduit 18 without passing through the turbine 13. The conduit 19 thus forms a by-pass or shunt around the turbine 13 from the conduit 17 to the conduit 18. The opening of the by-pass under the conditions just described decreases the supply of steam to the turbine 13 and lowers the pressure in the conduit 17. Lowering the pressure in the conduit 17 decreases the pressure drop or difference through the turbine 13 and this decreased drop together with the decreased supply of steam to the turbine tends to maintain it at a proper speed.

The lowering of the pressure in the conduit 17 as above described has another effect, namely, the pressure drop or difference of the auxiliary turbine 12 is increased and its speed increases. This increase in speed causes the governor 15 to operate the valve or device 16 to decrease the quantity of steam supplied to the turbine so that the steam consumption of the auxiliary turbines 12 and 13 has been reduced in response to the decreased load and consequent drop in pressure in the main turbine, thus increasing the efficiency of the system.

If a still more efficient utilization of the steam driving the auxiliary turbines be desired, the modification shown in Fig. 2 can be employed. In this form of the invention the by-pass conduit and valve are not used, all of the steam from the turbine 12 passing to the turbine 3 through the turbine 13 in which it performs useful work. The conduit 17 leads from the turbine 12 to a steam chest 22 in this form of the invention. A group of nozzles or other discharge devices 23 receives steam from the chest 22 and conduit 17 at all times and directs it against the wheel buckets of the turbine. The discharge from another group of nozzles 24 leading from the chest 22 is regulated by a valve 25 controlled by a governor or speed responsive device 26 driven from the shaft of the turbine 13. In this apparatus when the pressure falls off in the main turbine 3, thus subjecting the turbine 13 to a greater pressure drop or difference, the increased speed of the turbine 13 causes the governor 26 to open the nozzles of the group 24 one after the other, thus increasing the number of nozzles and the area of the combined nozzle passages supplying steam to the turbine. The opening and closing of a nozzle may be accompanied by throttling or the nozzles may be provided with quick acting valves that do not throttle. The effect of opening these additional nozzles is to lower the pressure in conduit 17. The lowering of the pressure in conduit 17 decreases the pressure drop or difference through the turbine 13 and tends to cause that turbine to assume its proper speed. The lowering of pressure in conduit 17 also results in an increase in the pressure drop or difference through the turbine 12 which tends to increase its speed. The governor 15 responds to this increase in speed and decreases the steam supply to the auxiliary turbines as before. Obviously, when the pressure in the main turbine returns to its normal value, the auxiliaries will automatically adjust themselves to this condition.

As will be evident to those skilled in this art the number of turbines in the series may be made any number greater than two, which number was chosen for the sake of convenient illustration of the invention.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

Having now fully described my invention, what I claim as new and desire to secure by Letters Patent of the United States, is:

1. In combination, a main turbine, auxiliary turbines, a conduit supplying motive fluid to the main turbine, a conduit means supplying motive fluid to the auxiliary turbines in series and conveying the exhaust therefrom into the main turbine at an intermediate pressure region, and a regulator for one of said auxiliary turbines which changes the pressure difference to which another of said auxiliary turbines is subjected.

2. In combination, independent turbines working at different pressures and through which the motive fluid passes in series relation in performing work, and a regulator for one turbine which varies the pressure difference to which the preceding turbine is subjected.

3. In combination, independent turbines working at different pressures and through which the motive fluid passes in series relation in performing useful work, a regulator for one turbine which varies the pressure difference to which the preceding turbine is subjected, and a governing mechanism for regulating the speed of the last mentioned turbine.

4. In combination, independent turbines working at different pressures and through which the motive fluid passes in series relation in performing useful work, a governor for one turbine which controls the exhaust pressure of the preceding turbine, and a governor for said latter turbine which controls the admission of fluid thereto.

5. In combination, a prime mover, a plurality of auxiliary turbines arranged in series relation, a conduit supplying steam to the first turbine of the series from a suitable source of supply, a conduit between the exhaust of the last turbine of the series and a region of suitable pressure in the prime mover, conduits leading exhaust steam from the outlet of each auxiliary turbine to the inlet of the next turbine in the series, a speed responsive device for controlling the supply of steam to the first turbine of the series, speed responsive devices actuated by the other turbines of the series, and means controlled by said devices for varying the pressure in said conduits leading exhaust steam from one auxiliary turbine to the next when the pressure in said region of the prime mover varies.

6. In combination, a main turbine, a plurality of auxiliary turbines arranged in series relation, a conduit supplying steam to the first turbine of the series from a suitable source of supply, a conduit between the exhaust of the last turbine of the series and a region of corresponding pressure in the main turbine, conduits leading exhaust steam from the outlet of each auxiliary turbine to the inlet of the next turbine in the series, a speed responsive device for controlling the supply of steam to the first turbine of the series, speed responsive devices actuated by the other turbines of the series, and means actuated by said devices for varying the supply of steam to said inlets from said conduits extending between the turbines and also varying the pressure in said conduits when the pressure in said region in the main turbine varies.

7. In combination, a main turbine, a plurality of auxiliary turbines arranged in series relation, a conduit supplying steam to the first turbine of the series from a suitable source of supply, a conduit between the exhaust of the last turbine of the series and a region of corresponding pressure in the main turbine, conduits leading exhaust steam from the outlet of each auxiliary turbine to the inlet of the next turbine of the series, a speed responsive device for controlling the supply of steam to the first turbine of the series, a by-pass connecting the supply conduit of each of the turbines other than the first with its outlet conduit, and speed responsive devices actuated by the turbines other than the first which control said by-passes and vary the pressure in said supply conduits when the pressure in said region of the main turbine varies.

8. In combination, a main turbine, a plurality of auxiliary turbines operating on pressure differences less than that of the main turbine and arranged in series relation, a conduit for supplying steam to the first turbine of the series from a suitable source of supply, a conduit between the exhaust of the last turbine of the series and a region of corresponding pressure in the main turbine, conduits leading exhaust steam from the outlet of each auxiliary turbine to the inlet of the next turbine in the series, a speed responsive device for controlling the supply of steam to the first turbine of the series, a by-pass conduit connecting the supply conduit of each of the auxiliary turbines other than the first with its outlet conduit, a valve in each of said last mentioned conduits which regulates the flow of steam therethrough, speed responsive devices actuated by the auxiliary turbines other than the first, and connections between said devices and valves for operating the latter to vary the pressure in said supply conduits as the pressure in said region of the main turbine varies and cause the speed responsive device of the first turbine to vary the initial supply of steam to it and the other turbines of the series.

9. In combination, a prime mover, a plurality of auxiliary turbines arranged in series relation, a conduit supplying steam to the first turbine of the series from a suitable source of supply, a speed responsive device for controlling the supply of steam to the first turbine, a conduit between the exhaust of the last turbine of the series and a region of suitable pressure in the prime mover, conduits leading exhaust steam from the outlet of each auxiliary turbine to the steam chest of the next turbine of the series, discharging devices which direct steam from the chest against the turbine wheel buckets, and speed responsive devices actuated by the auxiliary turbines other than the first which vary the operative area of said discharge devices when the pressure in said region of the prime mover varies.

10. In combination, a main turbine, a plurality of auxiliary turbines arranged in series relation, a conduit supplying steam to the first turbine of the series from a suitable source of supply, a speed responsive device for controlling the supply of steam to the first turbine, a conduit between the exhaust of the last turbine of the series and a region of corresponding pressure in the main turbine, conduits leading exhaust steam from the outlet of each auxiliary turbine to the steam chest of the next turbine of the series, a plurality of nozzles for directing steam from the chest against the turbine wheel buckets, and speed responsive devices actuated by the auxiliary turbines other than the first which vary the number of nozzles in operation and thereby vary the pressure in the conduits extending between the auxiliary turbines as the pressure in the said region of the main turbine varies.

11. In combination, a main turbine, a plurality of auxiliary turbines arranged in series relation, a conduit supplying steam to the first turbine of the series from a suitable source of supply, a speed responsive device controlling the supply of steam to said first turbine, a conduit between the exhaust of the last turbine of the series and a region of corresponding pressure in the main turbine, conduits leading exhaust steam from the outlet of each turbine of the series to the steam chest of the next, speed responsive devices actuated by the auxiliary turbines other than the first, and a plurality of nozzles which direct steam from the chest against the turbine wheel buckets, some of said nozzles being in operation at all times and others being brought into and out of operation by said speed responsive devices as the pressure in said region of the main turbine varies, to thereby vary the pressure in the supply conduits of the auxiliary turbines other than the first and cause the speed responsive device of the first auxiliary turbine to decrease the initial supply of steam to the series of turbines.

In witness whereof, I have hereunto set my hand this 23d day of December, 1908.

WALTER KIESER.

Witnesses:
Luwig Cubelic,
Friedrich Ganzert.

---

Copies of this patent may be obtained for five cents each, by addressing the "Commissioner of Patents, Washington, D. C."

---

Correction in Letters Patent No. 1,081,387.

It is hereby certified that in Letters Patent No. 1,081,387, granted December 16, 1913, upon the application of Walter Kieser, of Berlin, Germany, for an improvement in "Turbine Systems," an error appears in the printed specification requiring correction as follows: Page 3, line 13, before the word "conduit" strike out the article "a"; and that the said Letters Patent should be read with this correction therein that the same may conform to the record of the case in the Patent Office.

Signed and sealed this 6th day of January, A. D., 1914.

[SEAL.]

J. T. NEWTON,
*Acting Commissioner of Patents.* of steam to it and the other turbines of the series.

9. In combination, a prime mover, a plurality of auxiliary turbines arranged in series relation, a conduit supplying steam to the first turbine of the series from a suitable source of supply, a speed responsive device for controlling the supply of steam to the first turbine, a conduit between the exhaust of the last turbine of the series and a region of suitable pressure in the prime mover, conduits leading exhaust steam from the outlet of each auxiliary turbine to the steam chest of the next turbine of the series, discharging devices which direct steam from the chest against the turbine wheel buckets, and speed responsive devices actuated by the auxiliary turbines other than the first which vary the operative area of said discharge devices when the pressure in said region of the prime mover varies.

10. In combination, a main turbine, a plurality of auxiliary turbines arranged in series relation, a conduit supplying steam to the first turbine of the series from a suitable source of supply, a speed responsive device for controlling the supply of steam to the first turbine, a conduit between the exhaust of the last turbine of the series and a region of corresponding pressure in the main turbine, conduits leading exhaust steam from the outlet of each auxiliary turbine to the steam chest of the next turbine of the series, a plurality of nozzles for directing steam from the chest against the turbine wheel buckets, and speed responsive devices actuated by the auxiliary turbines other than the first which vary the number of nozzles in operation and thereby vary the pressure in the conduits extending between the auxiliary turbines as the pressure in the said region of the main turbine varies.

11. In combination, a main turbine, a plurality of auxiliary turbines arranged in series relation, a conduit supplying steam to the first turbine of the series from a suitable source of supply, a speed responsive device controlling the supply of steam to said first turbine, a conduit between the exhaust of the last turbine of the series and a region of corresponding pressure in the main turbine, conduits leading exhaust steam from the outlet of each turbine of the series to the steam chest of the next, speed responsive devices actuated by the auxiliary turbines other than the first, and a plurality of nozzles which direct steam from the chest against the turbine wheel buckets, some of said nozzles being in operation at all times and others being brought into and out of operation by said speed responsive devices as the pressure in said region of the main turbine varies, to thereby vary the pressure in the supply conduits of the auxiliary turbines other than the first and cause the speed responsive device of the first auxiliary turbine to decrease the initial supply of steam to the series of turbines.

In witness whereof, I have hereunto set my hand this 23d day of December, 1908.

WALTER KIESER.

Witnesses:
LUWIG CUBELIC,
FRIEDRICH GANZERT.

---

Copies of this patent may be obtained for five cents each, by addressing the "Commissioner of Patents, Washington, D. C."

---

Correction in Letters Patent No. 1,081,387.

It is hereby certified that in Letters Patent No. 1,081,387, granted December 16, 1913, upon the application of Walter Kieser, of Berlin, Germany, for an improvement in "Turbine Systems," an error appears in the printed specification requiring correction as follows: Page 3, line 13, before the word "conduit" strike out the article "a"; and that the said Letters Patent should be read with this correction therein that the same may conform to the record of the case in the Patent Office.

Signed and sealed this 6th day of January, A. D., 1914.

[SEAL.]

J. T. NEWTON,

*Acting Commissioner of Patents.*

Correction in Letters Patent No. 1,081,387.

It is hereby certified that in Letters Patent No. 1,081,387, granted December 16, 1913, upon the application of Walter Kieser, of Berlin, Germany, for an improvement in "Turbine Systems," an error appears in the printed specification requiring correction as follows: Page 3, line 13, before the word "conduit" strike out the article "a"; and that the said Letters Patent should be read with this correction therein that the same may conform to the record of the case in the Patent Office.

Signed and sealed this 6th day of January, A. D., 1914.

[SEAL.]

J. T. NEWTON,

*Acting Commissioner of Patents.*